United States Patent
Kim

(10) Patent No.: US 12,010,444 B2
(45) Date of Patent: Jun. 11, 2024

(54) IMAGE SENSOR, IMAGE ACQUISITION APPARATUS, AND ELECTRONIC APPARATUS INCLUDING THE IMAGE ACQUISITION APPARATUS FOR SYNCHRONIZATION AND SERIALIZATION OF GENERATED PULSES

(71) Applicant: SAMSUNG ELECTRONICS CO., LTD., Suwon-si (KR)

(72) Inventor: Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/831,947

(22) Filed: Jun. 3, 2022

(65) Prior Publication Data
US 2023/0171518 A1    Jun. 1, 2023

(30) Foreign Application Priority Data
Nov. 26, 2021    (KR) .................. 10-2021-0166097

(51) Int. Cl.
H04N 25/71    (2023.01)
H04N 25/47    (2023.01)
H04N 25/75    (2023.01)

(52) U.S. Cl.
CPC .......... *H04N 25/745* (2023.01); *H04N 25/47* (2023.01); *H04N 25/75* (2023.01)

(58) Field of Classification Search
CPC .... H04N 25/47; H04N 25/745; H04N 5/3765; H04N 25/75; H04N 5/378
See application file for complete search history.

(56) References Cited

U.S. PATENT DOCUMENTS

| | | | |
|---|---|---|---|
| 2018/0270405 A1 | 9/2018 | Ota | |
| 2019/0288150 A1 | 9/2019 | Miyamoto et al. | |
| 2020/0252563 A1* | 8/2020 | Yasuda | H04N 25/772 |
| 2021/0014445 A1* | 1/2021 | Ishii | H01L 27/14643 |

(Continued)

FOREIGN PATENT DOCUMENTS

| | | |
|---|---|---|
| JP | 2019-140537 A | 8/2019 |
| JP | 2019-161551 A | 9/2019 |

(Continued)

OTHER PUBLICATIONS

Bruschini et al., "Single-photon avalanche diode imagers in biophotonics: review and outlook", Light: Science & Applications, Sep. 19, 2019, vol. 8.

(Continued)

*Primary Examiner* — Nicholas G Giles
(74) *Attorney, Agent, or Firm* — Sughrue Mion, PLLC

(57) ABSTRACT

According to an embodiment, an image sensor using photon counting includes: a plurality of sub-pixels arranged in one pixel; pulse generators which are respectively connected to the plurality of sub-pixels, and are configured to generate pulse signals based on electric signals generated based on photons incident on the plurality of sub-pixels; a synchronizer and serializer configured to synchronize and serialize pulse signals respectively output from the pulse generators; and a counter configured to count and output a number of the pulse signals that are synchronized and serialized.

20 Claims, 19 Drawing Sheets

(56) References Cited

U.S. PATENT DOCUMENTS

2021/0036036 A1 2/2021 Kobayashi et al.

FOREIGN PATENT DOCUMENTS

JP 2019-186925 A 10/2019
JP 2021-093583 A 6/2021

OTHER PUBLICATIONS

Yuki Maruyama et al., "A 1024 8, 700-ps Time-Gated SPAD Line Sensor for Planetary Surface Exploration With Laser Raman Spectroscopy and LIBS" 2021 IEEE Journal of Solid-State Circuits, Vo. 49, No. 1, Jan. 2014.

Jun Ogi et al., "A 250fps 124dB Dynamic-Range SPAD Image Sensor Stacked with Pixel-Parallel Photon Counter Employing Sub-Frame Extrapolating Architecture for Motion Artifact Suppression", 2021 IEEE International Solid-State Circuits Conference, Feb. 12, 2021.

\* cited by examiner

IMAGE SENSOR, IMAGE ACQUISITION APPARATUS, AND ELECTRONIC APPARATUS INCLUDING THE IMAGE ACQUISITION APPARATUS FOR SYNCHRONIZATION AND SERIALIZATION OF GENERATED PULSES

CROSS-REFERENCE TO RELATED APPLICATION

This application is based on and claims priority under 35 U.S.C. § 119 to Korean Patent Application No. 10-2021-0166097, filed on Nov. 26, 2021, in the Korean Intellectual Property Office, the disclosure of which is incorporated by reference herein in its entirety.

BACKGROUND

1. Field

Example embodiments of the present disclosure relates to image sensors, image acquisition apparatuses, and electronic apparatuses including the image acquisition apparatuses.

2. Description of the Related Art

An image sensor is a device that receives light incident from an object, and photoelectrically converts the received light into an electrical signal.

The image sensor uses a color filter, which includes an array of filter elements that selectively transmit red light, green light, and blue light for color expression, senses the amount of light that has passed through each filter element, and then forms a color image of the object through image processing.

Characteristics of image sensors such as a resolution, a frame rate, low light imaging, and high dynamic range (hereinafter, referred to as HDR) have been gradually improved. In order to simultaneously improve the HDR and the frame rate, a new imaging method has been proposed, and recently, an image sensor based on photon counting imaging technology has been developed.

Photon counting imaging uses a fast photodiode, for example, a single photon avalanche diode (hereinafter, referred to as an SPAD), to count the number of photons incident on a pixel for a certain period of time on a time axis, measures the amount of light for each pixel, and generates a two-dimensional image.

SUMMARY

Provided are image sensors, image acquisition apparatuses, and electronic apparatuses including the image acquisition apparatuses.

Additional aspects will be set forth in part in the description which follows and, in part, will be apparent from the description, or may be learned by practice of the presented embodiments of the disclosure.

According to an aspect of an example embodiment, provided is an image sensor using photon counting, the image sensor including: a plurality of sub-pixels arranged in one pixel; pulse generators which are respectively connected to the plurality of sub-pixels, and are configured to generate pulse signals based on electric signals generated based on photons incident on the plurality of sub-pixels; a synchronizer and serializer configured to synchronize and serialize pulse signals respectively output from the pulse generators; and a counter configured to count and output a number of the pulse signals that are synchronized and serialized.

According to an aspect of an example embodiment, provided is an image acquisition apparatus, including: a pixel array including a plurality of pixels, wherein a plurality of sub-pixels are arranged in each pixel of the plurality of pixels; pulse generators which are respectively connected to the plurality of sub-pixels and are configured to generate pulse signals based on electric signals generated based on photons incident on the plurality of sub-pixels; a synchronizer and serializer configured to synchronize and serialize pulse signals output from the pulse generators; a counter configured to count and output a number of the pulse signals that are synchronized and serialized; and an image sensor controller configured to generate image signals based on counting values output from counters respectively corresponding to the plurality of pixels of the pixel array.

According to an aspect of another embodiment, an electronic apparatus including the image acquisition apparatus is provided.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
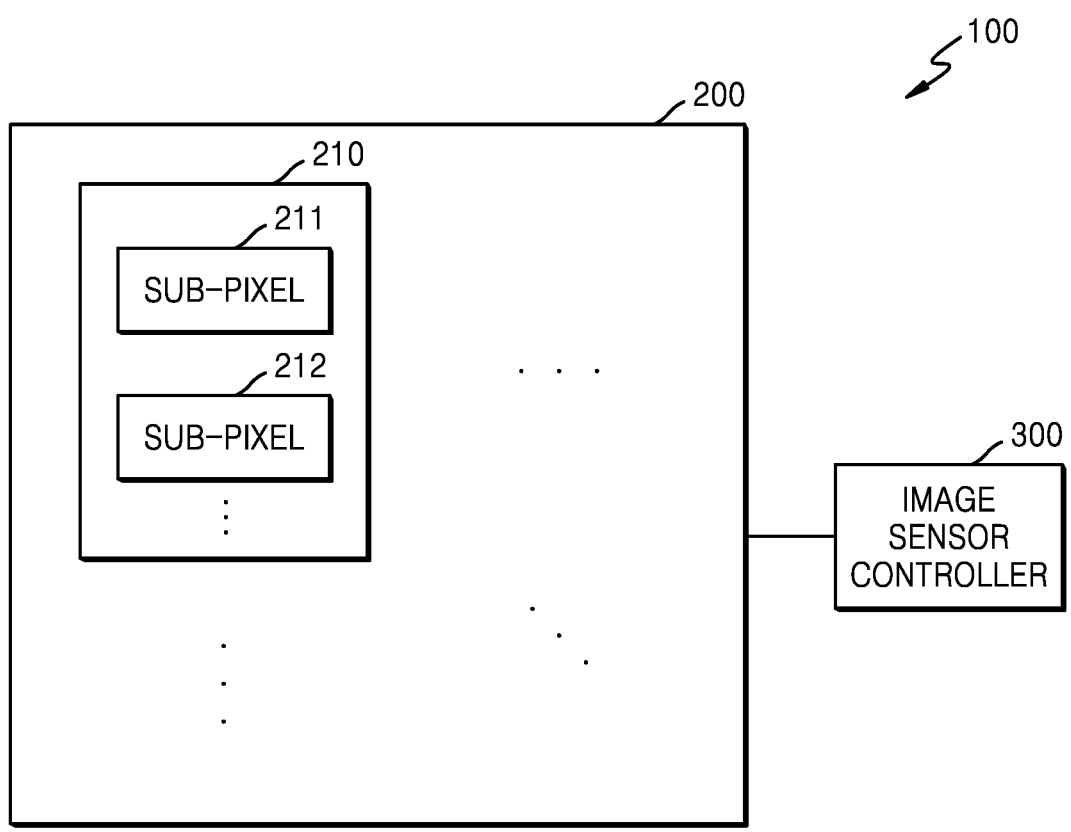
FIG. 1 is a schematic block diagram of an image acquisition apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described with reference to the accompanying drawings. The embodiments described below are only examples, and thus, it should be understood that the embodiments may be modified in various forms. In the drawings, like reference numerals refer to like elements throughout, and the sizes of elements may be exaggerated for clarity.

In the following description, when an element is referred to as being "above" or "on" another element, it may be directly on the other element while making contact with the other element or may be above the other element without making contact with the other element.

Although terms such as "first" and "second" are used to describe various elements, these terms are only used to distinguish one element from another element. These terms do not limit elements to having different materials or structures.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In the present disclosure, terms such as "unit" or "module" may be used to denote a unit that has at least one function or operation and is implemented with hardware, software, or a combination of hardware and software.

An element referred to with the definite article or a demonstrative pronoun may be construed as the element or the elements even though it has a singular form.

Operations of a method may be performed in an appropriate order unless explicitly described in terms of order or described to the contrary. In addition, examples or exemplary terms (for example, "such as" and "etc.") are used for the purpose of description and are not intended to limit the scope of the present disclosure unless defined by the claims.

In an embodiment, a single photon avalanche diode (SPAD) means a next-generation semiconductor optical device with extremely high efficiency enough to detect a single photon with a very high gain characteristic of the device. In an SPAD, when a voltage higher than a breakdown voltage of the device is applied, free electrons (carriers) are accelerated according to a very large electric field, causing a strong collision with an atom, and as a result, electrons bound to the atom are released, resulting in an impact ionization phenomenon in which the number of free electrons rapidly increases. This is called avalanche amplification, and due to this effect, the number of free electrons generated by photons irradiated from the outside toward an image sensor is greatly increased. In other words, even when the surrounding environment is very dark or light is irradiated from a very far distance, and only a very fine photon enters the image sensor, by amplifying the photon, an effect as if a large amount of photons enter the image sensor may be generated.

In imaging using photon counting, a two-dimensional image is generated by measuring the amount of light per pixel by counting the number of photons incident on a pixel for a certain period of time on a time axis by using an SPAD.

A related art image sensor generates a two-dimensional image by transmitting, to an external readout circuit, a voltage change generated by accumulating incident photons in floating diffusion (FD) for a certain period of time. On the other hand, an image sensor using photon counting may convert the voltage change into digital information in a pixel unit.

A pixel for photon counting imaging includes a high-speed photodiode, a pulse generator, and a counter circuit. Each pixel operates independently, and when a photon is incident thereon, a current flows in the high-speed photodiode and a digital pulse is output from the pulse generator. The number of pulses of the digital pulse are continuously accumulated in a counter at a rear end. Thus, when a pulse output is counted within a given time, a digital value proportional to an amount of photons may be obtained, thereby generating a two-dimensional image. Photon counting imaging may implement high-speed shooting and high dynamic range (HDR) compared to existing image sensor, and a dynamic range of about 120 dB or more may be implemented. However, the number of pulses varies greatly according to an illumination, and thus, it is difficult to select a size of a counter. In other words, the number of pulses decreases in low illumination, and the number of pulses increases in high illumination, and thus, a counter having a large memory is necessary for normal operation. In addition, techniques for reducing the number of counts by selectively driving a plurality of sub-pixels or by simply overlapping pulse signals generated from the sub-pixels have been developed, but these techniques still have disadvantages in that an accurate amount of photons in high illumination may not be calculated.

In an embodiment, one pixel may include a plurality of sub-pixels, and when a pulse corresponding to a photon input to each of the sub-pixels is output, signals generated asynchronously in parallel may be synchronized and serialized by synchronizing and realigning pulse signals of each of the sub-pixels on a time axis.

In an embodiment, the term "pixel" may be used to refer only to a photodiode that receives light, or to components or integrated circuits implemented in a pixel. For example, the term "pixel" may be used to collectively refer to a photodiode, a pulse generator, and a counter that implement one pixel.

In an embodiment, the term "image sensor" may be used to refer to a photoelectric conversion device that senses light and converts the detected light into an electrical signal. Accordingly, the term "image sensor" may be used to collectively refer to a pixel or a pixel array, or a pixel a pixel circuit.

FIG. 1 is a schematic block diagram of an image acquisition apparatus 100 according to an embodiment.

Referring to FIG. 1, the image acquisition apparatus 100 may include a pixel array 200 and an image sensor controller 300.

A predetermined number (e.g., M×N) of a plurality of pixels 210 may be arranged in the pixel array 200. Each of the pixels may be independently operated. Although not shown in FIG. 1, the pixel array 200 may include peripheral circuits, a vertical scan circuit, a horizontal scan circuit, a reading circuit, an output circuit, and a control circuit. The plurality of pixels 210 and the peripheral circuits may be arranged on different layers from each other. For example, a layer on which the plurality of pixels 210 are arranged may be stacked on a chip layer of a readout circuit. In an embodiment, the pixel 210 includes an SPAD and counts a single photon, and thus may have a low noise and a high dynamic range.

Each of the pixels 210 may include a plurality of sub-pixels 211 and 212. Each of the sub-pixels 211 and 212 may include a single photon avalanche diode (SPAD). The number of sub-pixels included in each of the pixels is not limited.

Although not shown, each of the sub-pixels 211 and 212 may include a photodiode, a pulse generator, and a counter. In an embodiment, the pulse generator may generate a pulse signal based on an electric signal generated according to photons incident on the photodiode. The counter may count and output the number of pulse signals output from the pulse generator. A structure and detailed operation of the pixel 210 or sub-pixels arranged in the pixel 210 are described below with reference to FIGS. 2 and 3.

The image sensor controller 300 may generate an image signal by using an output value output from the pixel array 200. Here, the output value may include a counting value of a counter of each pixel and a period of a pulse signal. The image sensor controller 300 may generate an image signal based on a counting result value output from counters corresponding to each of the pixels of the pixel array 200. The image sensor controller 300 may control a synchronization and serialization of a pulse signal based on a processing period of a pulse generated from each of the sub-pixels. Here, the processing period may be determined based on a photoelectric conversion speed and a quenching time of each of the sub-pixels.

In addition, the image sensor controller 300 may control a synchronization and serialization of pulse signals generated from each of the sub-pixels based on the number of sub-pixels in one pixel and a processing period of each of the sub-pixels. For example, the synchronization and serialization may be performed according to a synchronization and serialization period obtained by dividing the processing period by the number of sub-pixels.

Figure 2:
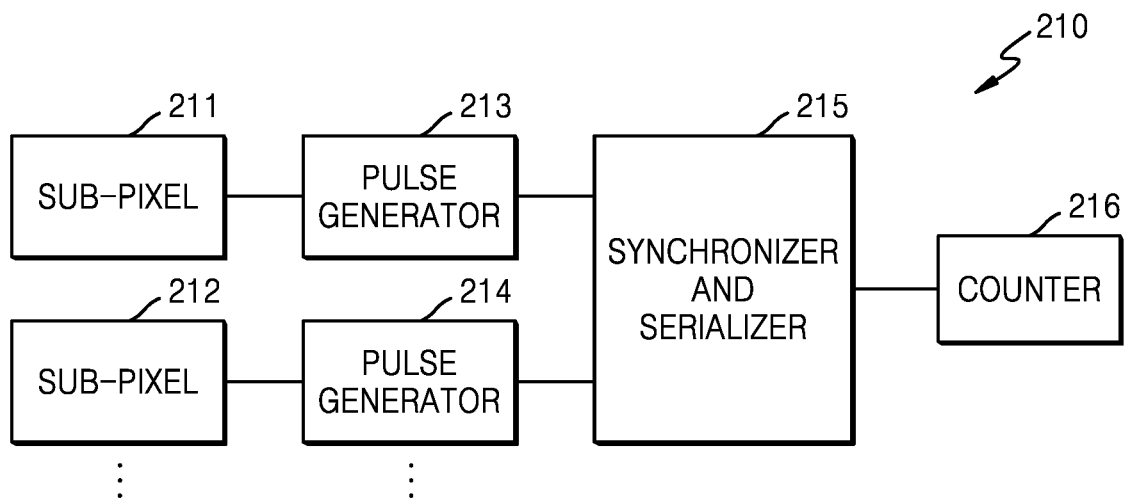
FIG. 2 is a detailed block diagram of an image sensor shown in FIG. 1.

FIG. 2 is a detailed block diagram of an image sensor 210 shown in FIG. 1.

Referring to FIG. 2, the image sensor 210, or a pixel included in the image sensor 210, may include a plurality of sub-pixels 211 and 212, pulse generators 213 and 214 respectively connected to the sub-pixels 211 and 212, a synchronizer and serializer 215 configured to receive pulse signals generated by the pulse generators 213 and 214, and a counter 216. The image sensor 210 may count the number of photons incident on the respective sub-pixels for a certain time, that is, an exposure period, by using a trigger pulse induced by the photons, thereby sensing an amount of light.

Each of the sub-pixels 211 and 212 may include a photodiode. The photodiode may include an avalanche photodiode (hereinafter, referred to as an APD) or an SPAD, which operates in a Geiger mode. In the Geiger mode, a reverse voltage greater than a breakdown voltage is applied so as to detect a single photon in the APD. In the Geiger mode, because an intensity of an electric field applied to an amplification layer is large, even when a small amount of photons is absorbed, a breakdown phenomenon of an avalanche current occurs so that a large current pulse is output, and thus, a single photon may be detected.

The pulse generators 213 and 214 may generate pulse signals based on an electric signal generated according to photons incident on the sub-pixels 211 and 212. The pulse generators 213 and 214 may generate a pulse at a frequency according to a frequency at which a photon is received.

The synchronizer and serializer 215 may perform a synchronization and serialization based on processing periods of the respective pulse signals. In this case, a result of counting pulses serialized on the time axis may be equal to the sum of counted pulses of the respective sub-pixels. Thus, pulses simultaneously generated on the time axis may be serialized in the same processing period, and thus, even when the number of sub-pixels increases, the number of pulses transmitted to the counter may be equal to the sum of pulses of the respective sub-pixels. The synchronization and serialization is further described below, with reference to FIGS. 5 and 6.

The counter 216 may count and output the number of pulse signals that are synchronized and serialized. A counting value output from the counter 216, or a counting result value, becomes a pixel value. Here, the counting value may be the sum of the number of photons input within a frame period. The counter 216 may temporarily store the counting value, and output the counting value according to an external control signal. In an embodiment, the counting value may be equal to the sum obtained by counting the number of pulse signals generated in the respective sub-pixels.

Although not shown in FIG. 2, an image signal generator (not shown) may generate an image signal by using the output value of the counter 216, that is, a pixel value.

Although only two sub-pixels 211 and 212 are shown in FIG. 2, the present disclosure is not limited thereto, and three or more sub-pixels may be used to implement the same embodiment. In this case, when only a period of synchronization and serialization in the synchronizer and serializer 215 changes, a method of synchronizing and serializing pulse signals generated from the respective sub-pixels is the same.

Figure 3:
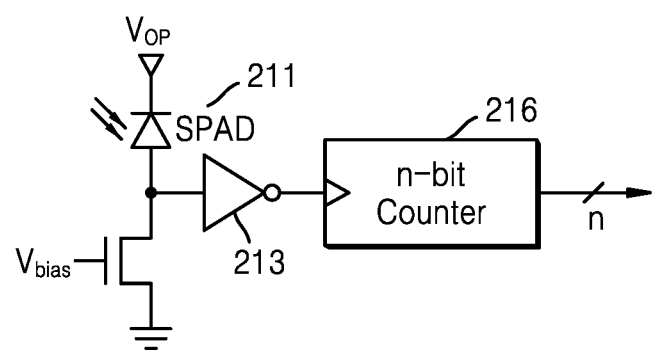
FIG. 3 is a schematic circuit diagram of photon counting imaging.

FIG. 3 is a schematic circuit diagram of photon counting imaging, and for explaining generation and counting of a pulse signal in one sub-pixel.

Referring to FIGS. 2 and 3 together, the sub-pixel 211 includes a photodiode. In addition, the sub-pixel 211 may include an SPAD. A cathode electrode of the photodiode 211 may be connected to an operating voltage Vop, and an anode electrode may be connected to an n-type metal-oxide-semiconductor field-effect transistor (NMOS) and an input side of the pulse generator 213. A gate electrode of the NMOS transistor may be connected to a bias voltage Vbias.

The pulse generator 213 may include an inverter circuit. An output of the pulse generator 213 may be connected to the counter 216. In an embodiment, a pulse signal generated from the pulse generator 213 may be input to the synchronizer and serializer, so that the synchronized and serialized pulse may be input to the counter 216.

The counter 216 may have n bits, for example, 8 to 12 bits. The size of the counter 216 is not limited thereto, and a counter of various sizes may be used according to a pixel size or applications of the image sensor. The counter 216 may include a synchronous counter, a non-synchronous counter, or a non-synchronous ripple counter. In addition, the counter 216 may include a D flip-flop circuit.

Referring to FIG. 3, when a reverse bias voltage greater than a breakdown voltage is applied to the cathode electrode of the SPAD 211 as the operating voltage Vop, carriers generated by the incidence of a single photon causes avalanche amplification, so that a large current is applied to the input side of the pulse generator 213 through the SPAD 211.

The pulse generator 213 may generate an electric signal applied to the input side, as a pulse signal. Here, the pulse generator 212 may include an inverter circuit.

The NMOS transistor may be turned on or off by applying the bias voltage Vbias to the gate electrode of the NMOS transistor, and a current generated in the SPAD 211 may be transmitted to the pulse generator 213. Here, the NMOS transistor is shown, but the present disclosure is not limited thereto, and various bias voltage application circuits may be applicable.

Although not shown in FIG. 3, a quenching circuit for restricting an excess current due to avalanche amplification occurring in the SPAD 211 may be further included. As a reverse voltage applied to the SPAD increases, the probability that thermal electrons are in an excited state and the tunneling probability increase, and thus, a dark current in which an avalanche current occurs without an absorption of photons may increase. When the avalanche current occurs, an excess current may flow. Thus, a continuous flow of the avalanche current may be suppressed by the quenching circuit.

Image sensor technologies including a photon counting method have been developed into various forms. For example, a pixel structure for photon counting and a structure of embedding a counter in one pixel have been developed. In addition, an SPAD element receiving light may have "dark count rate" and "dead-time" characteristics. In the dark count rate, a pulse is generated even when no photon is incident, and in the dead-time, once a pulse is generated, a new pulse is not generated for a certain period of time. Thus, to respond to various environments, a sub-pixel structure has been developed in which a plurality of SPAD elements are included in one pixel.

Figure 4:
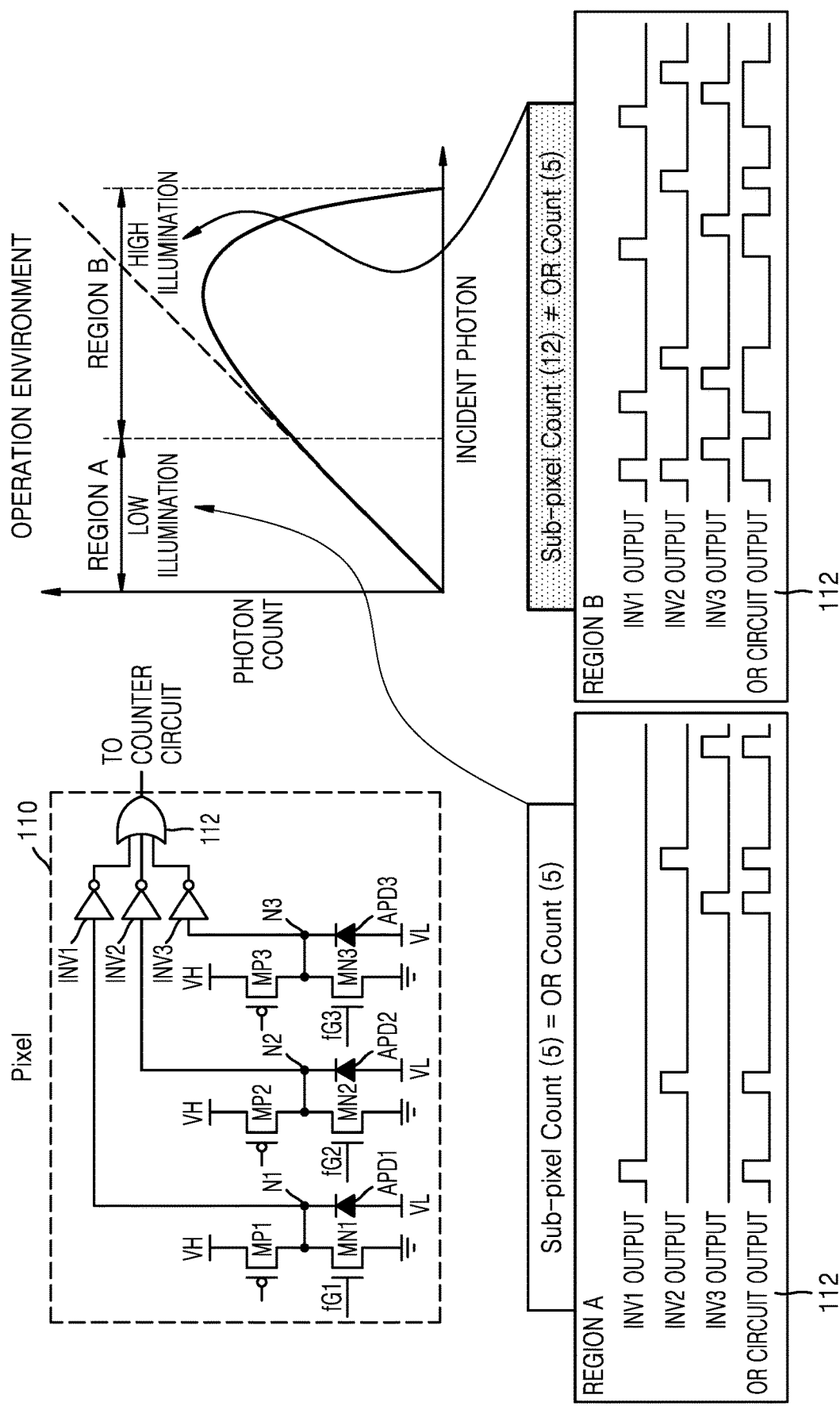
FIG. 4 shows diagrams to explain comparative examples of photon counting in low illumination and high illumination.

FIG. 4 shows diagrams to explain comparative examples of photon counting in low illumination and high illumination. In the related art as shown in FIG. 4, three SPAD elements, that is, sub-pixels, are included in one pixel 110, and the three SPAD elements are selectively operated according to an environment or illumination.

As shown in FIG. 4, three sub-pixels APD1 to APD3 may each receive light, and output pulse signals in parallel. An OR logic circuit 112 may perform an OR operation and outputs a result thereof, when a pulse is output from each of the sub-pixels.

In region A, it may be understood that, in low illumination, the total sum of pulse signals output from the respective sub-pixels is 5, and the sum of pulses output via the OR logic circuit 112 is 5. On the other hand, in region B, in high illumination, the total sum of pulse signals output from the respective sub-pixels is 12, and the number of pulses output via the OR logic circuit 112 is 5. According to an illumination, the amount of incident photons increases, and the number of photon counts also increases. In this case, when photon count signals INV1, INV2, and INV3 generated in the sub-pixels simply overlap, an output signal generates counts that are less than the counts of the individual sub-pixels. As described above, in the related art, a malfunction may be prevented by controlling the number of sub-pixels operating according to an illumination; however, it is difficult to calculate an accurate amount of photons in high illumination.

Figure 5:
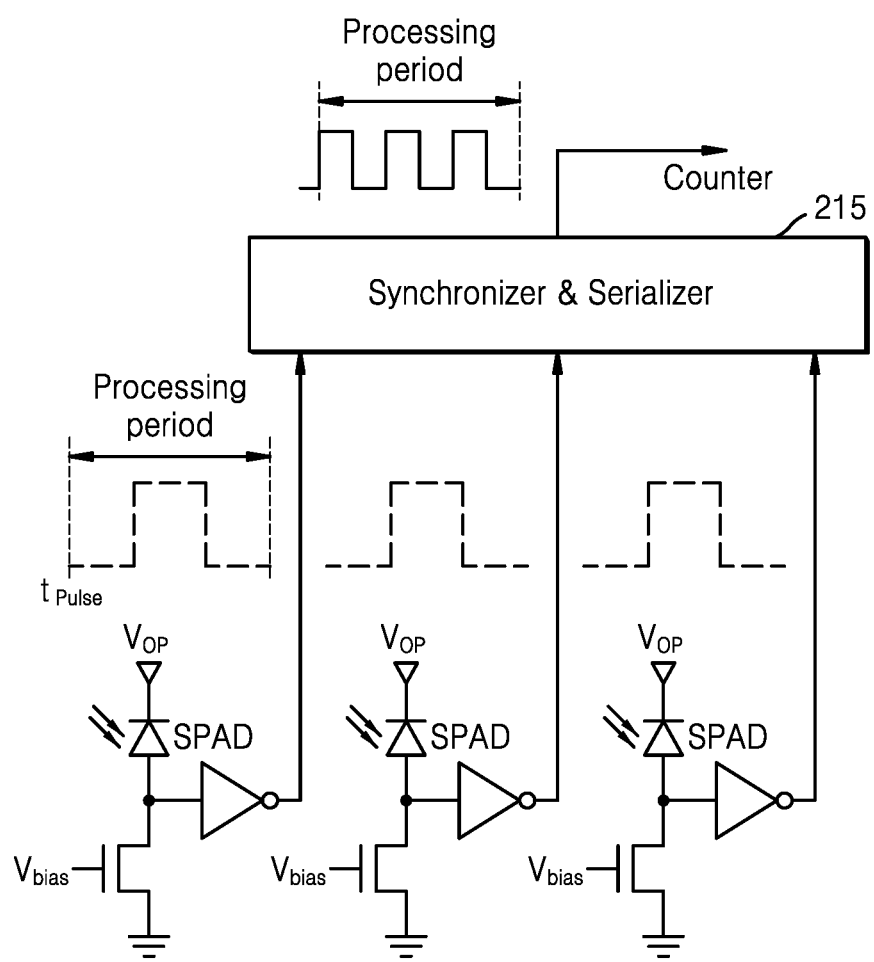
FIGS. 5 and 6 are diagrams to explain a synchronization and serialization of pulse signals output from a plurality of sub-pixels, according to an example embodiment.
Figure 6:
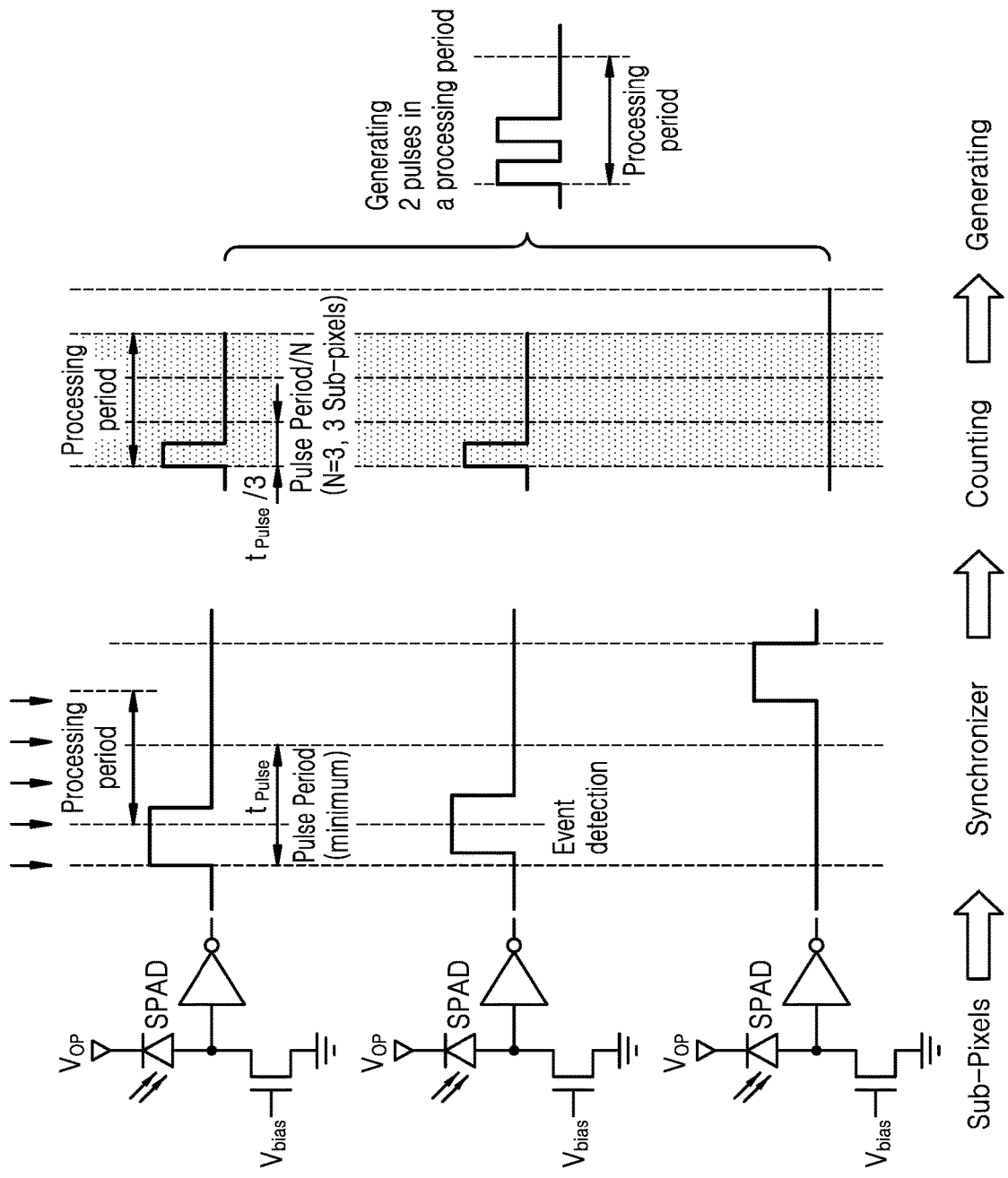

FIGS. 5 and 6 are diagrams to explain synchronizing and serializing pulse signals output from a plurality of sub-pixels, according to an example embodiment.

Referring to FIG. 5, it is described as an example that three sub-pixels are included in one pixel. Each of the sub-pixels may be an SPAD. Inverter circuits, which are pulse generators respectively connected to SPADs, may generate pulse signals and output the generated pulse signals within a processing period when each of the SPADs receives light. The pulse signal output from each of the pulse generators may be input to the synchronizer and serializer 215. Here, the processing period may be a minimum time of a pulse generated in each of the sub-pixels. The processing period may be a time based on a photoelectric conversion speed and a quenching time of an SPAD, and may vary according to an operation environment of the image sensor. However, the processing period, or the minimum time of the pulse, may be preset at the time of designing a structure and circuit of the device.

The synchronizer and serializer 215 may synchronize pulse signals input from the three sub-pixels, for example, three pulse signals. Here, the synchronization includes synchronizing start timings of the pulse signals and reducing a period of each of the pulse signals. In addition, the serialization includes generating the synchronized pulse signals as pulse signals within the processing period.

The synchronizer and serializer 215 may generate three pulse signals each having three pulse signal periods within one processing period, and transmit the generated three pulse signals to the counter.

In an embodiment, one pixel may include a plurality of sub-pixels, and when a pulse corresponding to a photon input to each of the sub-pixels is output, pulse signals of the respective sub-pixels may be synchronized and realigned on a time axis, so that signals generated asynchronously in parallel may be synchronized and serialized. Thus, the number of counts of the pulse signals serialized on the time axis may be equal to the sum of counts of the pulse signals of the respective sub-pixels. The pulse signals simultaneously generated on the time axis may be serialized within the same processing period, so that the number of pulses transmitted to the counter may be equal to the sum of pulses of the respective sub-pixels, even when the number of sub-pixels increases.

Referring to FIG. 6, pulse signals may be output in parallel from the respective three sub-pixels. The pulse signals may be generated within the processing period and output to the synchronizer and serializer.

Two pulse signals are detected in a first processing period, and one pulse signal is detected in a next processing period. For synchronization, a period of a pulse signal, $t_{pulse}$, may be divided by 3, which is the number of pulses. Here, a period of $t_{pulse}/3$ refers to a clock period or a synchronization and serialization period. For serialization, two pulse signals may be generated within one processing period. A period of each of the two pulse signals may be $t_{pulse}/3$, which is the synchronization and serialization period. As a result, two pulses signals may be output within one processing period. The pulse signal detected in the next processing period may be synchronized and serialized in the same manner along with pulse signals of other sub-pixels, within the next processing period.

In an embodiment, when three sub-pixels are included, pulses may be generated asynchronously or in parallel, in response to incident photons. Periods of the pulses, $t_{pulse}$, may vary according to an environment, but a processing period or minimum time of the pulses may be selected when the pixel is manufactured. The minimum time may be ensured for repetitive normal operation of the SPAD elements. In an embodiment, synchronization may be performed by using a clock signal ($t_{pulse}$/number of sub-pixels) having a period that is one third of $t_{pulse}$. In addition, the number of the individual sub-pixels generated within one processing period may be counted. When the counting is completed, the same number of pulses may be output within the processing period.

Herein, three sub-pixels are described as an example, but the example is not limited thereto, and the same synchronization and serialization method may be applicable to various numbers of sub-pixels.

Figure 7:
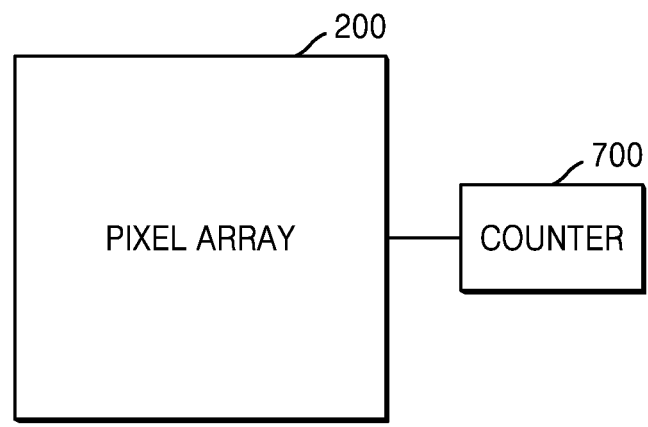
FIGS. 7 to 9 are schematic block diagrams of an image sensor according to various example embodiments.
Figure 8:
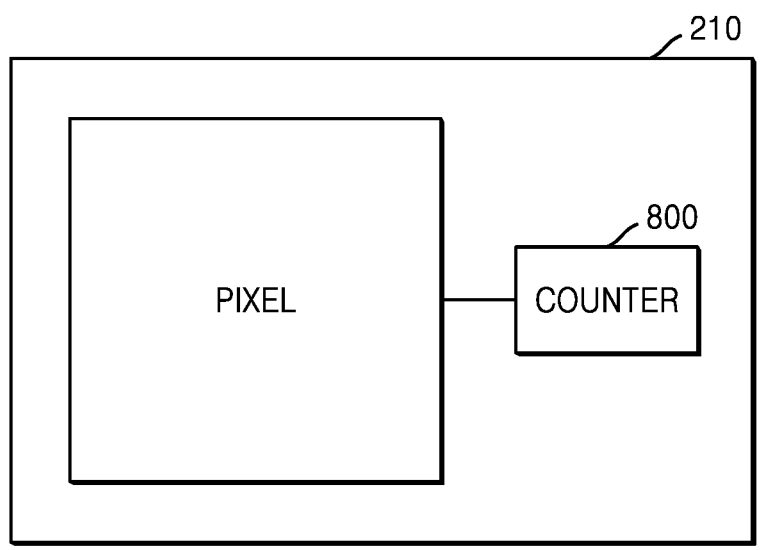
Figure 9:
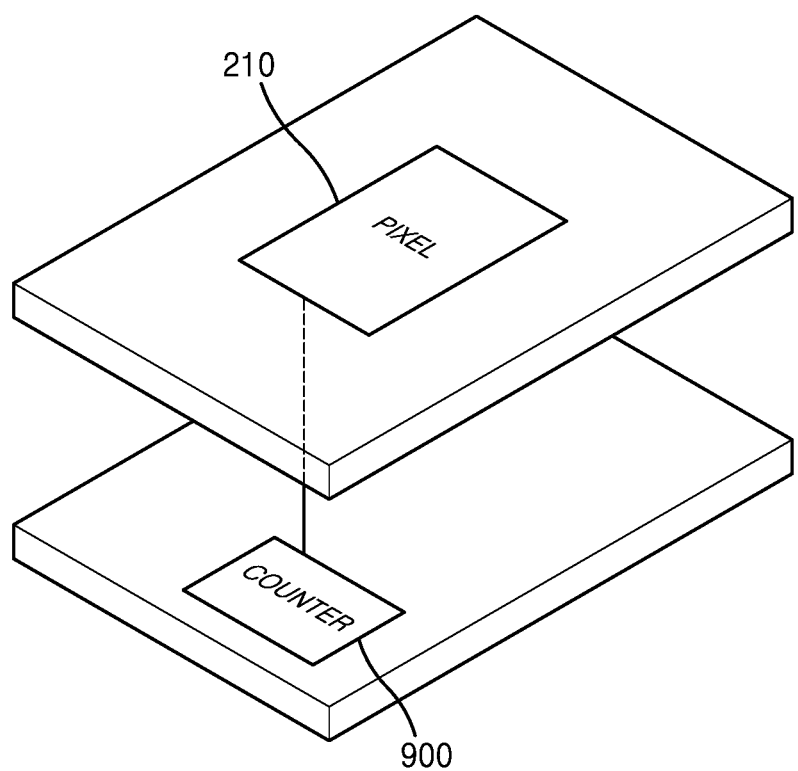

FIGS. 7 to 9 are schematic block diagrams of an image sensor according to various example embodiments. In an embodiment, for photon counting, in order to effectively transmit pulse signals generated from a plurality of sub-pixels to the counter, a pulse signal may be synchronized and serialized. The synchronized and serialized pulse signals may be transmitted to the counter. The counter may be arranged in the pixel or outside the pixel, according to a circuit design.

Referring to FIG. 7, a counter 700 may be arranged outside the pixel array 200. Here, the number of counters 700 may correspond to the number of pixels 210 in the pixel array 200.

Referring to FIG. 8, a counter 800 may be arranged in the pixel 210. Here, the one pixel 210 includes a plurality of sub-pixels, but the counter may be in one-to-one correspondence with the pixel 210.

Referring to FIG. 9, the pixel array 200 including a plurality of pixels 210 may be arranged in an upper portion of the image sensor, and a counter 900 correspond to each of the pixels 210 may be arranged in a lower portion of the image sensor, and the pixel and the counter may be implemented on different layers from each other.

In an embodiment, in order to compensate for dead-time of a pixel or sub-pixel of an image sensor, a pulse signal may be generated for effective photon counting in a pixel structure having a plurality of sub-pixels. Through the method, pulses in a number proportional to the amount of incident photons may be generated in low illumination and high illumination, so that the number of photons may be accurately counted.

In addition, the complexity of a pixel circuit and the size of the counter may be reduced, and thus, a high-resolution photon counting image sensor may be realized.

The image acquisition apparatus 100 described above may be employed in various high-performance optical apparatuses or electronic apparatuses. The electronic apparatus may be, for example, a smartphone, a mobile phone, a cell phone, a personal digital assistant (PDA), a laptop, a personal computer (PC), various portable devices, home appliances, a security camera, a medical camera, an automobile, an Internet of Things (IoT) device, or another mobile or non-mobile computing device, but is not limited thereto.

In addition to the image acquisition apparatus 100, the electronic apparatuses may further include a processor for controlling image sensors provided therein, for example, an application processor (AP). The electronic apparatuses may control a plurality of hardware or software components by driving an operating system or an application program in the processor and may perform various data processing and operations. The processor may further include a graphics processing unit (GPU) and/or an image signal processor (ISP). When the processor includes an ISP, an image (or video) obtained using an image sensor may be stored and/or output using the processor.

Figure 10:
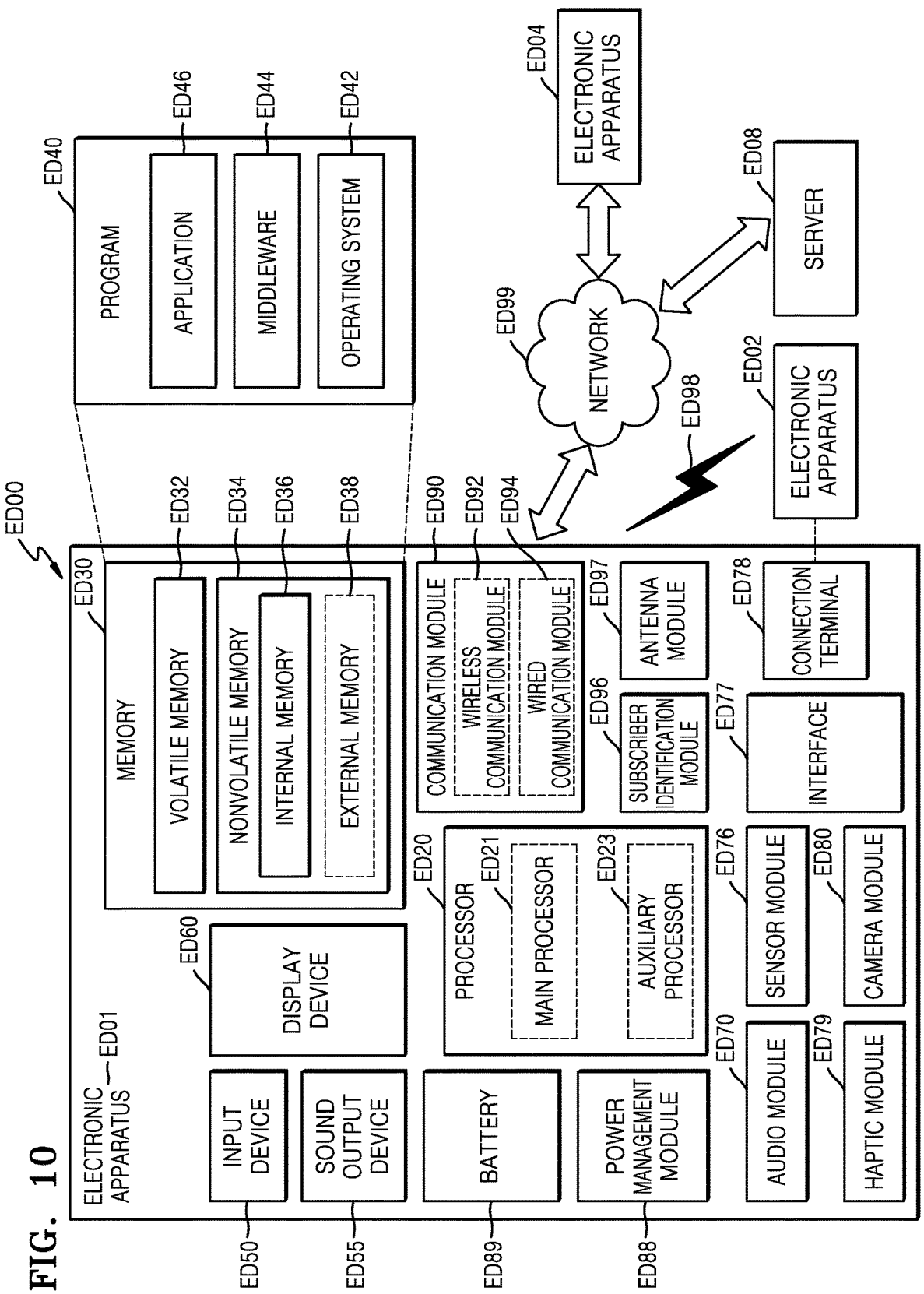
FIG. 10 is a block diagram showing a schematic structure of an electronic apparatus according to an example embodiment.

FIG. 10 is a block diagram showing a schematic structure of an electronic apparatus ED01 according to an embodiment. Referring to FIG. 10, in a network environment ED00, an electronic apparatus ED01 may communicate with another electronic apparatus ED02 through a first network ED98 (a near-field wireless communication network, etc.) or may communicate with another electronic apparatus ED04 and/or a server ED08 through a second network ED99 (a far-field wireless communication network, etc.). The electronic apparatus ED01 may communicate with the electronic apparatus ED04 through the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (the display device ED60, etc.) of the components may be omitted from the electronic apparatus ED01, or other components may be added to the electronic apparatus ED01. Some of the components may be implemented in one integrated circuit. For example, the sensor module ED76 (a fingerprint sensor, an iris sensor, an illuminance sensor, etc.) may be embedded in the display device ED76 (a display or the like). In addition, when an image sensor has a spectral function, some sensor-module functions (color sensing, illuminance sensing, etc.) may be implemented in the image sensor instead of being implemented in the sensor module ED76.

The processor ED20 may execute software (a program ED40 or the like) to control one or more other components (hardware or software components, etc.) of the electronic apparatus ED01 connected to the processor ED20, and may perform a variety of data processing or operations. As a portion of the data processing or operations, the processor ED20 may load instructions and/or data received from other components (the sensor module ED76, the communication module ED90, etc.) into a volatile memory ED32, process the instructions and/or data stored in the volatile memory ED32, and store result data in a nonvolatile memory ED34. The processor ED20 may include a main processor ED21 (a central processing unit, an application processor, or the like) and an auxiliary processor ED23 (a GPU, an ISP, a sensor hub processor, a communication processor, or the like), which is operated independently or together with the main processor ED21. The auxiliary processor ED23 may consume less power than the main processor ED21 and may perform specialized functions.

The auxiliary processor ED23 may control functions and/or states related to some (the display device ED60, the sensor module ED76, the communication module ED90, etc.) of the components of the electronic apparatus ED01 on behalf of the main processor ED21 while the main processor ED21 is in an inactive (e.g., sleep) state or together with the main processor ED21 while the main processor ED21 is in an active (e.g., application execution) state. The auxiliary processor ED23 (an ISP, a communication processor or the like) may be implemented as a portion of other functionally relevant components (the camera module ED80, the communication module ED90, etc.).

The memory ED30 may store a variety of data required by the components (the processor ED20, the sensor module ED76, etc.) of the electronic apparatus ED01. The data may include, for example, software (the program ED40, etc.) and input data and/or output data for commands related thereto. The memory ED30 may include the volatile memory ED32 and/or the nonvolatile memory ED34. The nonvolatile memory ED32 may include an internal memory ED36 fixed to the electronic apparatus ED01 and an external memory ED38 removable from the electronic apparatus ED01.

The program ED40 may be stored as software in the memory ED30, and may include an operating system ED42, middleware ED44, and/or an application ED46.

The input device ED50 may receive commands and/or data to be used for the components (the processor ED20, etc.) of the electronic apparatus ED01 from the outside (a user, etc.) of the electronic apparatus ED01. The input device ED50 may include a microphone, a mouse, a keyboard, and/or a digital pen (a stylus pen or the like).

The audio output device ED55 may output an audio signal to the outside of the electronic apparatus ED01. The audio output device ED55 may include a speaker and/or a receiver. The speaker may be used for general purposes such as multimedia playback or record playback, and the receiver may be used to receive incoming calls. The receiver may be provided as a portion of the speaker or may be implemented as a separate device.

The display device ED60 may visually provide information to the outside of the electronic apparatus ED01. The display device ED60 may include a display, a hologram device, or a projector, and a control circuit for controlling devices. The display device ED60 may include touch circuitry set to sense a touch, and/or sensor circuitry (a pressure sensor, etc.) configured to measure the intensity of force generated by the touch.

The audio module ED70 may convert sound into an electrical signal, and vice versa. The audio module ED70 may obtain sound through the input device ED50, or may output sound through the audio output device ED55 and/or speakers and/or headphones of another electronic apparatus (the electronic apparatus ED02 or the like) directly or wirelessly connected to the electronic apparatus ED01.

The sensor module ED76 may detect an operating state (power, temperature, etc.) of the electronic apparatus ED01 or an external environmental state (user status, etc.), and may generate an electrical signal and/or a data value corresponding to the detected state. The sensor module ED76 may include a gesture sensor, a gyro sensor, a barometric sensor, a magnetic sensor, an acceleration sensor, a grip sensor, a proximity sensor, a color sensor, an infrared (IR) sensor, a biological sensor, a temperature sensor, a humidity sensor, and/or an illuminance sensor.

The interface ED77 may support one or more designated protocols, which may be used to directly or wirelessly connect the electronic apparatus ED01 with other electronic apparatuses (the electronic apparatus ED02, etc.). The interface ED77 may include a high definition multimedia interface (HDMI), a universal serial bus (USB) interface, a secure digital (SD) card interface, and/or an audio interface.

A connection terminal ED78 may include a connector through which the electronic apparatus ED01 may be physically connected to other electronic apparatuses (the electronic apparatus ED02, etc.). The connection terminal ED78 may include an HDMI connector, a USB connector, an SD card connector, and/or an audio connector (a headphone connector, etc.).

The haptic module ED79 may convert an electrical signal into a mechanical stimulus (vibration, movement, etc.) or an electrical stimulus that a user may perceive through tactile sensation or kinesthesia. The haptic module ED79 may include a motor, a piezoelectric element, and/or an electric stimulation device.

The camera module ED80 may capture a still image and a moving image. The camera module ED80 may include the image acquisition apparatus 100 described above, and may include additional lens assembly image signal processors, and/or flashes. The lens assembly included in the camera module ED80 may collect light coming from an object to be imaged.

The power management module ED88 may manage power supplied to the electronic apparatus ED01. The power management module ED88 may be implemented as a portion of a power management integrated circuit PMIC.

The battery ED89 may supply power to components of the electronic apparatus ED01. The battery ED89 may include a non-rechargeable primary battery, a rechargeable secondary battery, and/or a fuel cell.

The communication module ED90 may support establishment of a direct (wired) communication channel and/or a wireless communication channel between the electronic apparatus ED01 and other electronic apparatuses (the electronic apparatus ED02, the electronic apparatus ED04, the server ED08, etc.), and communication through the established communication channel. The communication module ED90 operates independently of the processor ED20 (an application processor, etc.) and may include one or more communication processors supporting direct communication and/or wireless communication. The communication module ED90 may include a wireless communication module ED92 (a cellular communication module, a short-range wireless communication module, a global navigation satellite system (GNSS), or the like) and/or a wired communication module ED94 (a local area network (LAN) communication module, a power line communication module, or the like). A corresponding communication module from among these communication modules may communicate with other electronic apparatuses through the first network ED98 (a local area network such as Bluetooth, WiFi Direct, or infrared data association (IrDA)) or the second network ED99 (a telecommunication network such as a cellular network, the Internet, or computer networks (LAN, WAN, etc.)). These various types of communication modules may be integrated into a single component (a single chip or the like) or may be implemented as a plurality of separate components (multiple chips). The wireless communication module ED92 may identify and authenticate the electronic apparatus ED01 within a communication network such as the first network ED98 and/or the second network ED99 using subscriber information (an international mobile subscriber identifier (IMSI), etc.) stored in the subscriber identity module ED96.

The antenna module ED97 may transmit and/or receive signals and/or power to and/or from the outside (other electronic apparatuses, etc.). An antenna may include a radiator made of a conductive pattern formed on a substrate (a PCB, etc.). The antenna module ED97 may include one or more such antennas. When a plurality of antennas are included in the antenna module ED97, the communication module ED90 may select an antenna suitable for a communication method used in a communication network, such as the first network ED98 and/or the second network ED99, among the plurality of antennas. Signals and/or power may be transmitted or received between the communication module ED90 and other electronic apparatuses through the selected antenna. Other components (an RFIC, etc.) besides the antenna may be included as part of the antenna module ED97.

Some of the components may be connected to each other and exchange signals (commands, data, etc.) through a communication method between peripheral devices (a bus, general purpose input and output (GPIO), a serial peripheral interface (SPI), a mobile industry processor interface (MIPI), or the like).

Commands or data may be transmitted or received between the electronic apparatus ED01 and an external apparatus such as the electronic apparatus ED04 through the server ED08 connected to the second network ED99. The other electronic apparatuses ED02 and ED04 may be the same as or different from the electronic apparatus ED01. All or some of the operations of the electronic apparatus ED01 may be executed by one or more of the other electronic apparatuses ED02, ED04, and ED08. For example, when the electronic apparatus ED01 needs to perform certain functions or services, the electronic apparatus ED01 may request one or more other electronic apparatuses to perform some or all of the functions or services instead of directly executing the functions or services. One or more other electronic apparatuses that have received the request may execute an additional function or service related to the request, and may transfer results of the execution to the electronic apparatus ED01. To this end, cloud computing, distributed computing, and/or client-server computing techniques may be used.

Figure 11:
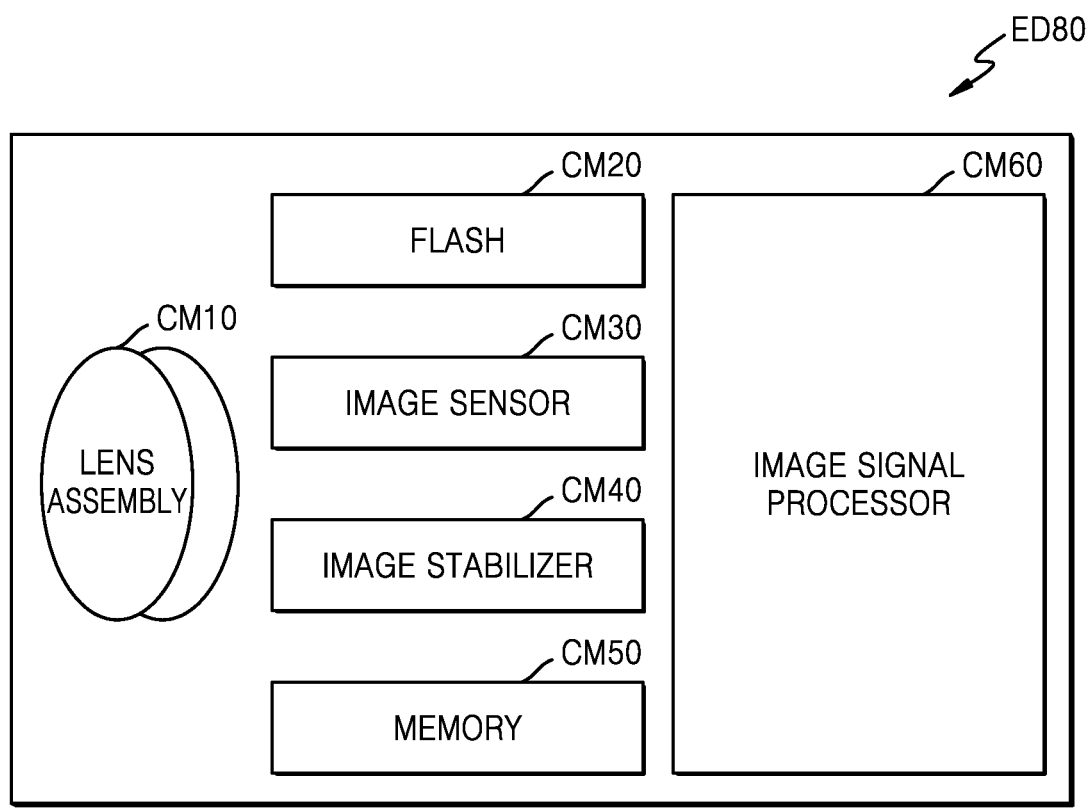
FIG. 11 is a block diagram of a camera module included in the electronic apparatus of FIG. 10.

FIG. 11 is a block diagram of the camera module ED80 included in the electronic apparatus of FIG. 10. The camera module ED80 may include the image acquisition apparatus 100 described above, or may have a structure modified therefrom. Referring to FIG. 11, the camera module ED80 may include a lens assembly CM10, a flash CM20, an image sensor CM30, an image stabilizer CM40, a memory CM50 (a buffer memory, etc.), and/or an image signal processor CM60.

The image sensor CM30 may be an image sensor described with reference to FIGS. 1 to 3, and use photon counting. Thus, an HDR and a high frame rate may be realized while minimizing (or reducing) a pixel size of the image sensor. An image sensor using photon counting according to an embodiment may generate a pulse signal based on an electric signal generated according to photons respectively incident on sub-pixels arranged in one pixel, and count and output the number of pulse signals obtained by synchronizing and serializing the output pulse signals. Thus, the image sensor CM30 may synchronize and realign the pulse signals of the respective sub-pixels on the time axis, thereby synchronizing and serializing signals generated asynchronously in parallel. In addition, the amount of photons may be accurately counted in high illumination as well as low illumination, and also, it is simple to realize a circuit design for accurately counting the amount of photons in high illuminance.

The lens assembly CM10 may collect light coming from an object to be imaged. The camera module ED80 may include a plurality of lens assemblies CM10, and in this case, the camera module ED80 may be a dual camera, a 360-degree camera, or a spherical camera. Some of the plurality of lens assemblies CM10 may have the same lens properties (field of view, focal length, autofocus, F Number, optical zoom, etc.) or different lens properties. Each of the lens assemblies CM10 may include a wide-angle lens or a telephoto lens.

The lens assembly CM10 may be configured such that image sensors included in the image sensor CM30 form an optical image of an object and/or focus may be controlled.

The flash CM20 may emit light used to enhance light emitted or reflected from an object. The flash CM20 may include one or more light emitting diodes (a red-green-blue (RGB) LED, a white LED, an infrared LED, an ultraviolet LED, etc.), and/or a xenon lamp.

The image stabilizer CM40 may move one or more lenses included in the lens assembly CM10 or the image sensor CM30 in a specific direction in response to a movement of the camera module ED80 or the electronic apparatus ED01 including the camera module ED80, or may control operating characteristics of the image sensor CM30 (adjustment of read-out timing, etc.) to compensate for negative effects caused by movement of the camera module ED80 or the electronic apparatus ED01. The image stabilizer CM40 may detect a movement of the camera module ED80 or the electronic apparatus ED01 by using a gyro sensor (not shown) or an acceleration sensor (not shown) arranged inside or outside the camera module ED80. The image stabilizer CM40 may be an optical image stabilizer.

In the memory CM50, some or all of data obtained through the image sensor 1000 may be stored for the next image processing operation. For example, when a plurality of images are obtained at a high speed, the obtained original data (Bayer-patterned data, high-resolution data, or the like) may be stored in the memory CM50 and only a low-resolution image may be displayed. Then, the original data of a selected image (user selection, etc.) may be transferred to the ISP CM60. The memory CM50 may be integrated into the memory ED30 of the electronic apparatus ED01 or may be configured as a separate memory that may be independently operated.

The ISP CM60 may perform one or more image processes on an image obtained through the image sensor CM30 or image data stored in the memory CM50.

In addition, the one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The ISP CM60 may control (exposure time control, read-out timing control, etc.) components (the image sensor CM30, etc.) included in the camera module CM80. An image processed by the ISP CM60 may be stored again in the memory CM50 for additional processing or may be provided to external components (the memory ED30, the display device ED60, the electronic apparatus ED02, the electronic apparatus ED04, the server ED08, etc.) of the camera module ED80. The ISP CM60 may be integrated into the processor ED20 or may be configured as a separate processor that operates independently of the processor ED20. When the ISP CM60 is provided separately from the processor ED20, an image processed by the ISP CM60 may be displayed on the display device ED60 after being further processed by the processor ED20.

The electronic apparatus ED01 may include a plurality of camera modules ED80 having different attributes or functions. In this case, one of the plurality of camera modules ED80 may be a wide-angle camera, and another of the plurality of camera modules ED80 may be a telephoto camera. Similarly, one of the plurality of camera modules ED80 may be a front camera, and another of the plurality of camera modules ED80 may be a rear camera.

FIGS. 12 to 21 show various examples of an electronic apparatus including an image acquisition apparatus according to example embodiments.

Figure 12:
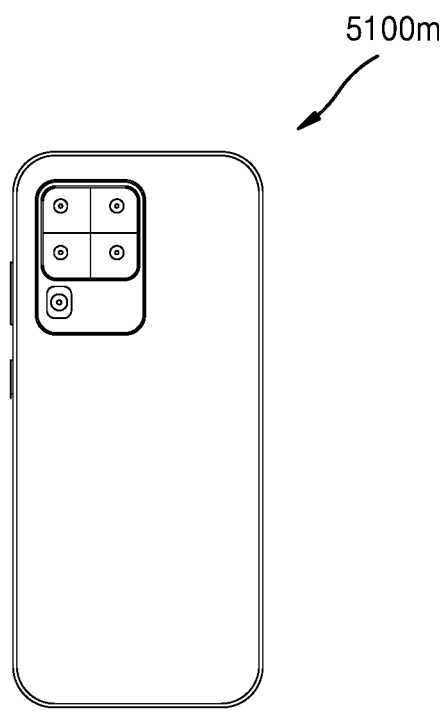
FIGS. 12 to 21 are diagrams of various examples of an electronic apparatus including an image acquisition apparatus according to example embodiments.
Figure 13:
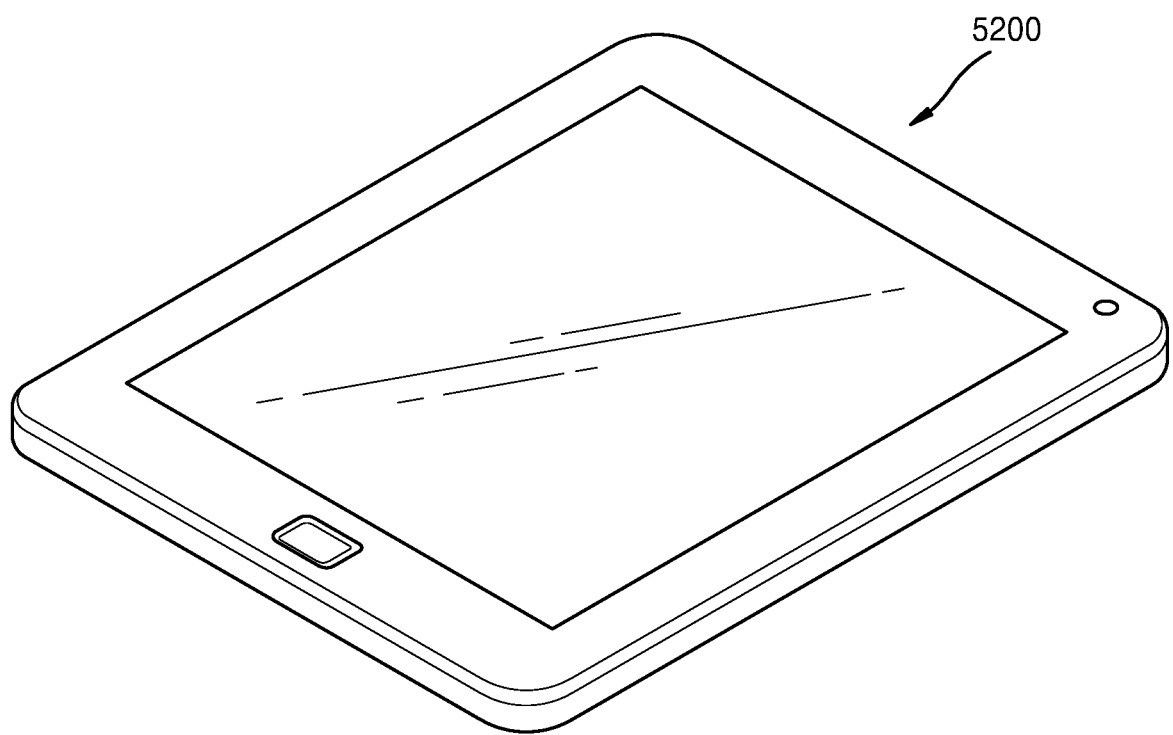
Figure 14:
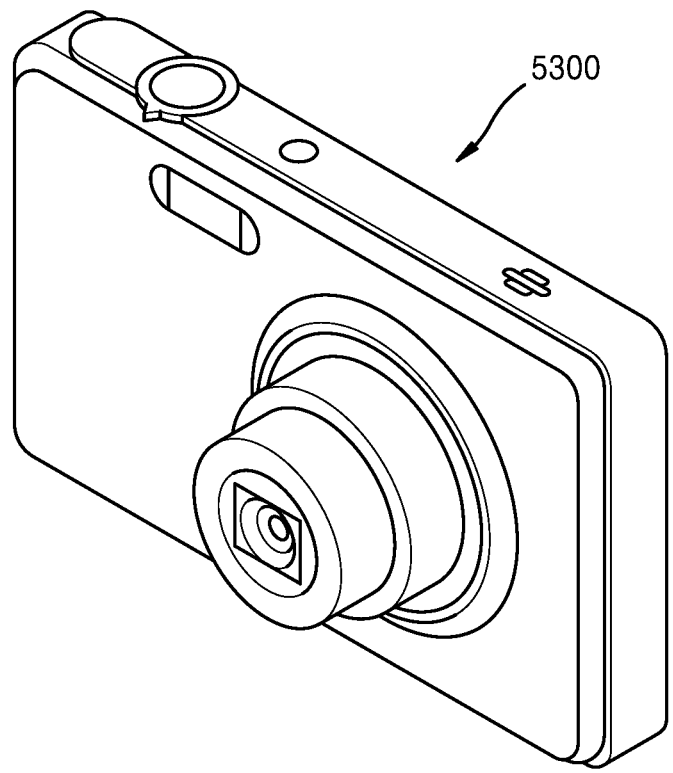
Figure 15:
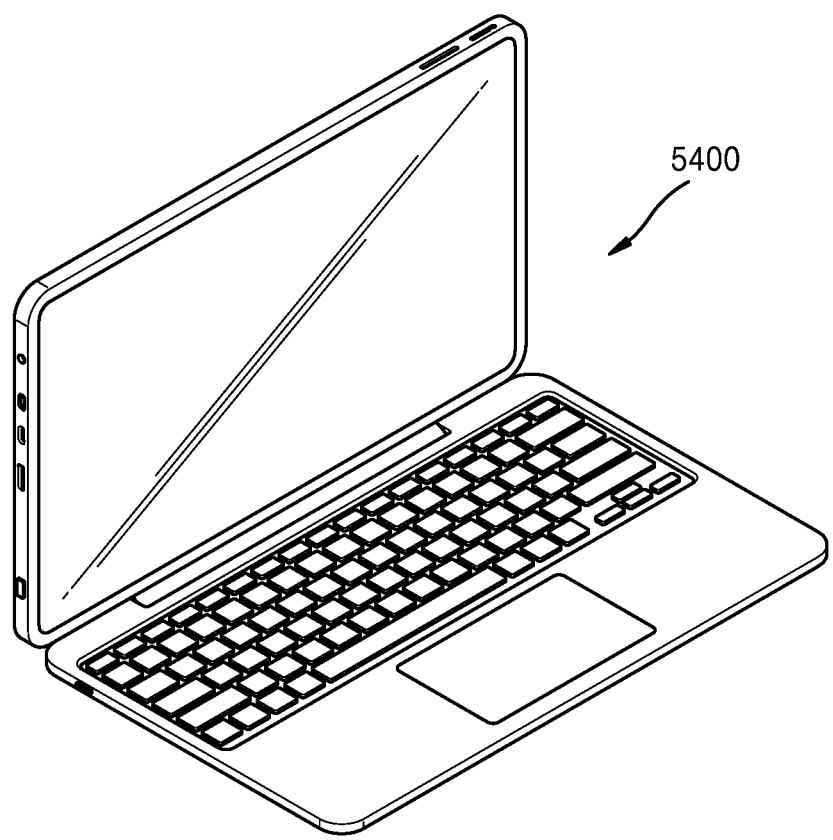
Figure 16:
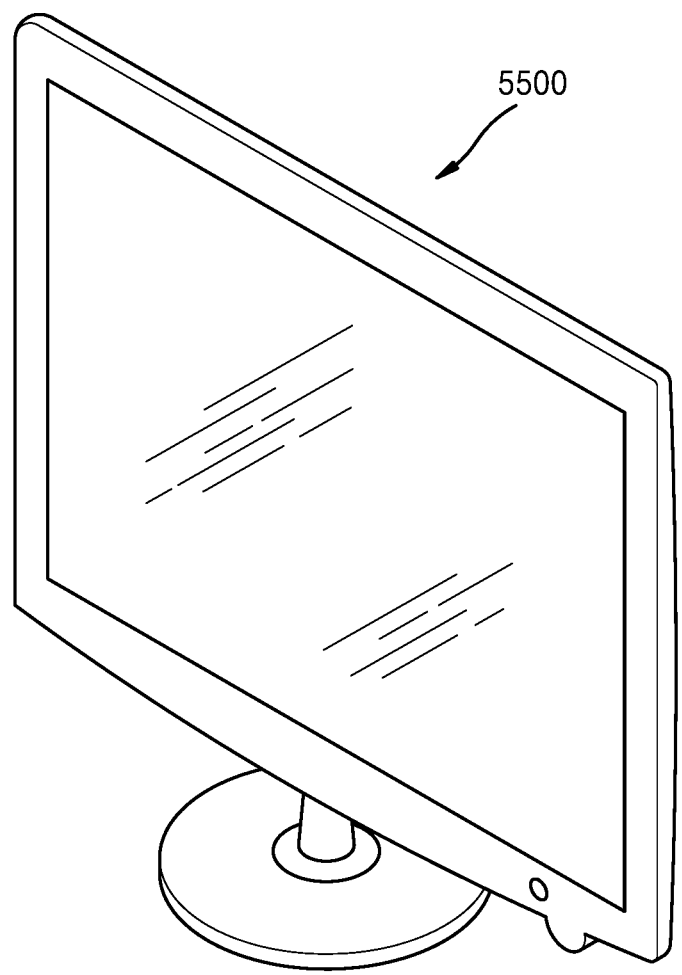

An image acquisition apparatus according to example embodiments may be applied to a mobile phone or smartphone 5100m shown in FIG. 12, a tablet or smart tablet 5200 shown in FIG. 13, a digital camera or camcorder 5300 shown in FIG. 14, a laptop computer 5400 shown in FIG. 15, or a television or smart television 5500 shown in FIG. 16. For example, the smartphone 5100m or the smart tablet 5200 may include a plurality of high-resolution cameras each having a high-resolution image sensor mounted thereon. The high-resolution cameras may be used to extract depth information of objects in an image, adjust out of focus of an image, or automatically identify objects in an image.

Figure 17:
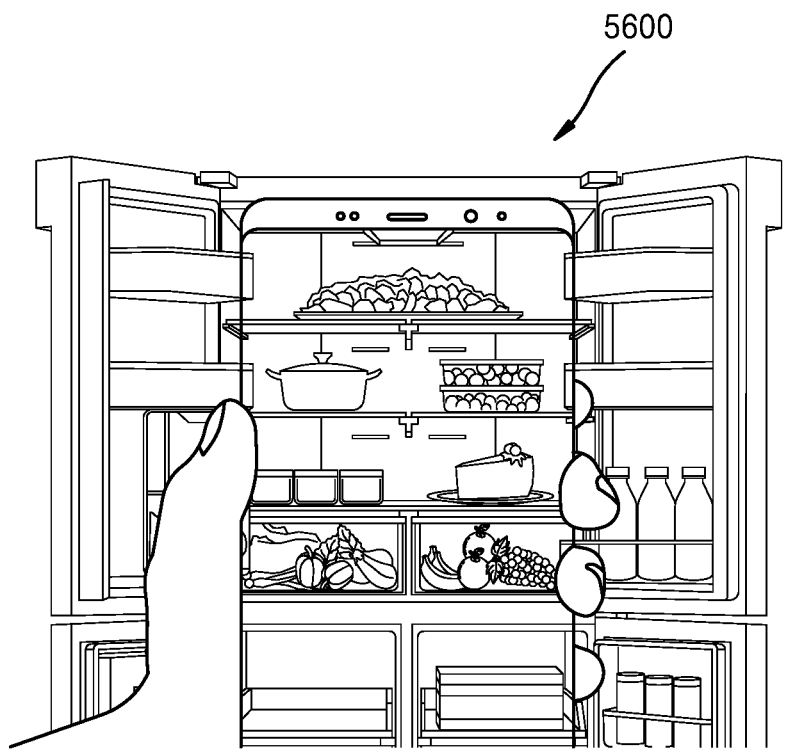
Figure 18:
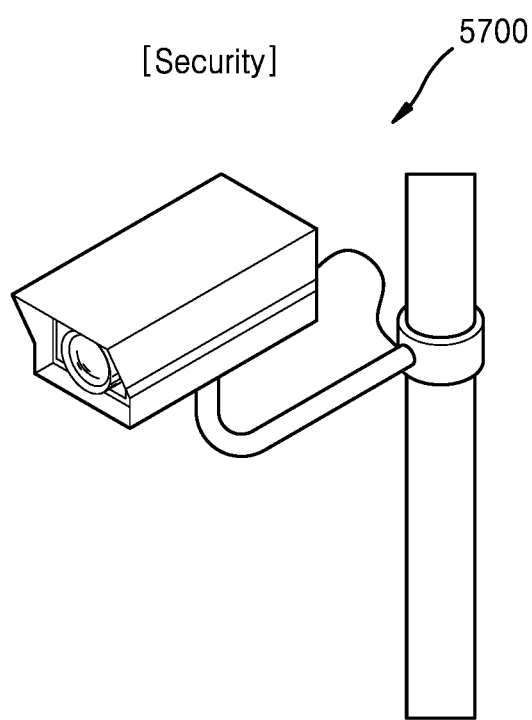
Figure 19:
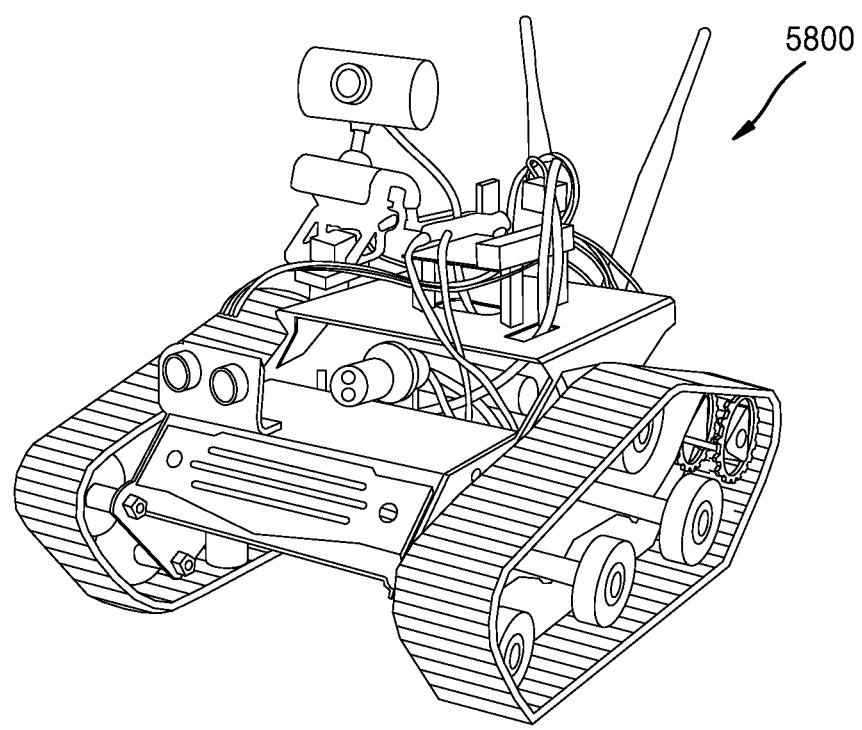
Figure 20:
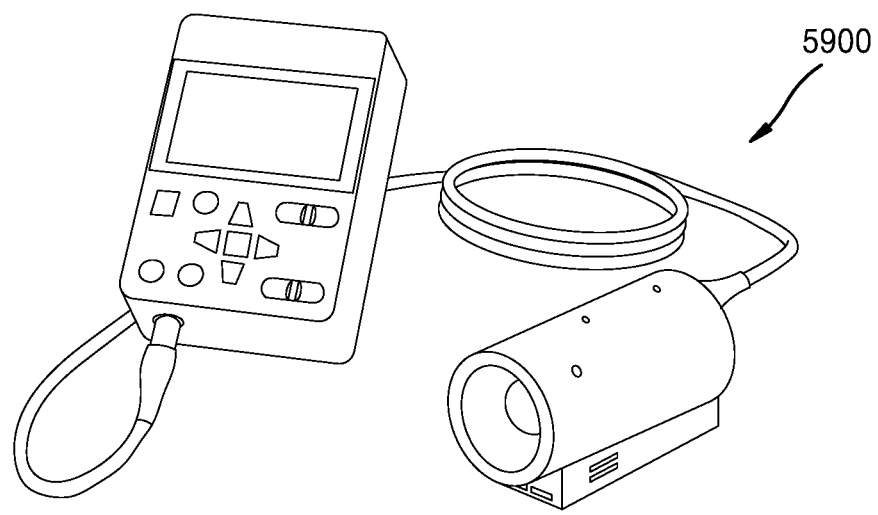

In addition, the image acquisition apparatus 100 may be applied to a smart refrigerator 5600 shown in FIG. 17, a security camera 5700 shown in FIG. 18, a robot 5800 shown in FIG. 19, a medical camera 5900 shown in FIG. 20, and the like. For example, the smart refrigerator 5600 may automatically recognize food contained in the smart refrigerator 5600 by using the image acquisition apparatus 100, and may inform a user of whether a specific food is contained in the smart refrigerator 5600, the type of food put into or out of the smart refrigerator 5600, and the like through a smartphone. The security camera 5700 may provide an ultra-high-resolution image and may recognize an object or a person in the ultra-high-resolution image even in a dark environment owing to high sensitivity of the security camera 5700 The robot 5800 may be sent to a disaster or industrial site that cannot be directly accessed by humans and may provide high-resolution images. The medical camera 5900 may provide a high-resolution image for diagnosis or surgery, and may have a dynamically adjustable field of view.

Figure 21:
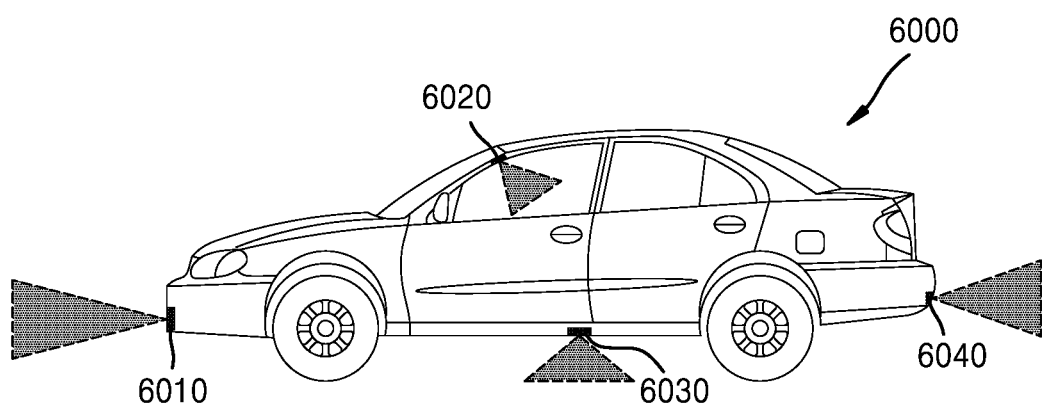

In addition, the image acquisition apparatus 100 may be applied to a vehicle 6000 as shown in FIG. 21. The vehicle 6000 may include a plurality of vehicle cameras 6010, 6020, 6030, and 6040 arranged at various positions. Each of the vehicle cameras 6010, 6020, 6030, and 6040 may include an image acquisition apparatus according to an embodiment. The vehicle 6000 may use the vehicle cameras 6010, 6020, 6030, and 6040 to provide a driver with various information about the interior or surroundings of the vehicle 6000, and may provide information necessary for autonomous driving by automatically recognizing objects or people in images.

In an image sensor according to an example embodiment, one pixel includes a plurality of sub-pixels, and when a pulse corresponding to a photon input to each of the sub-pixels is output, pulse signals of the respective sub-pixels may be synchronized and realigned on the time axis, thereby synchronizing and serializing signals generated asynchronously in parallel.

In addition, the amount of photons may be accurately counted in high illumination as well as low illumination, and a circuit design for accurate photon counting in high illumination may be simply realized.

The image acquisition apparatus according to an example embodiment may be employed in various electronic apparatuses.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. An image sensor using photon counting, the image sensor comprising:
    a plurality of sub-pixels arranged in one pixel;
    pulse generators which are respectively connected to the plurality of sub-pixels, and are configured to generate pulse signals based on electric signals generated based on photons incident on the plurality of sub-pixels;
    a synchronizer and serializer configured to synchronize and serialize pulse signals respectively output from the pulse generators; and
    a counter configured to count and output a number of the pulse signals that are synchronized and serialized,
    wherein the pulse signals generated by the pulse generators correspond to photons incident on the plurality of sub-pixels at a same or overlapping timing, and
    wherein the synchronizer and serializer is further configured to:
        synchronize the pulse signals by synchronizing start timings of the pulse signals; and
        serialize the pulse signals by realigning the synchronized pulse signals such that the synchronized pulse signals are output at different timings.

2. The image sensor of claim 1, wherein the plurality of sub-pixels include a single photon avalanche diode (SPAD).

3. The image sensor of claim 1, wherein the plurality of sub-pixels include at least three sub-pixels.

4. The image sensor of claim 1, wherein the synchronizer and serializer is further configured to perform synchronization and serialization based on a processing period of a pulse signal generated from each sub-pixel of the plurality of sub-pixels.

5. The image sensor of claim 4, wherein the processing period is determined based on a photoelectric conversion speed and a quenching time of a sub-pixel of the plurality of sub-pixels.

6. The image sensor of claim 5, wherein the synchronizer and serializer is further configured to perform the synchronization and serialization based on a number of the plurality of sub-pixels and the processing period.

7. The image sensor of claim 6, wherein the synchronizer and serializer is further configured to perform the synchronization and serialization based on a synchronization and serialization period obtained by dividing the processing period by the number of the plurality of sub-pixels.

8. The image sensor of claim 7, wherein the synchronizer and serializer is further configured to generate a synchronization and serialization pulse signal by synchronizing and serializing pulse signals respectively output from the pulse generators and present in the synchronization and serialization period.

9. The image sensor of claim 1, wherein the counter is positioned in the one pixel.

10. The image sensor of claim 1, wherein the counter is positioned outside the one pixel.

11. The image sensor of claim 1, wherein the counter is positioned on a layer different from a layer on which the one pixel is arranged.

12. An image acquisition apparatus comprising:
    a pixel array including a plurality of pixels, wherein a plurality of sub-pixels are arranged in each pixel of the plurality of pixels;
    pulse generators which are respectively connected to the plurality of sub-pixels and are configured to generate pulse signals based on electric signals generated based on photons incident on the plurality of sub-pixels;

a synchronizer and serializer configured to synchronize and serialize pulse signals output from the pulse generators;

a counter configured to count and output a number of the pulse signals that are synchronized and serialized; and an image sensor controller configured to generate image signals based on counting values output from counters respectively corresponding to the plurality of pixels of the pixel array, wherein the pulse signals generated by the pulse generators correspond to photons incident on the plurality of sub-pixels at a same or overlapping timing, and wherein the synchronizer and serializer is further configured to:

synchronize the pulse signals by synchronizing start timings of the pulse signals; and serialize the pulse signals by realigning the synchronized pulse signals such that the synchronized pulse signals are output at different timings.

13. The image acquisition apparatus of claim 12, wherein the plurality of sub-pixels include a single photon avalanche diode (SPAD).

14. The image acquisition apparatus of claim 12, wherein the plurality of sub-pixels include at least three sub-pixels.

15. The image acquisition apparatus of claim 12, wherein the image sensor controller is further configured to control the synchronizer and serializer based on a processing period of a pulse signal generated from each pixel of the plurality of sub-pixels.

16. The image acquisition apparatus of claim 15, wherein the processing period is determined based on a photoelectric conversion speed and a quenching time of a sub-pixel of the plurality of sub-pixels.

17. The image acquisition apparatus of claim 15, wherein the image sensor controller is further configured to control the synchronizer and serializer based on a number of the plurality of sub-pixels and the processing period.

18. The image acquisition apparatus of claim 17, wherein the image sensor controller is further configured to control the synchronizer and serializer based on a synchronization and serialization period obtained by dividing the processing period by the number of the plurality of sub-pixels.

19. The image acquisition apparatus of claim 12, wherein the counter is positioned in a pixel, outside the pixel, and/or on a layer different from a layer on which the pixel is arranged.

20. An electronic apparatus including the image acquisition apparatus of claim 12.

* * * * *